No. 870,746.
PATENTED NOV. 12, 1907
J. D. PENNOCK.
METHOD OF MAKING SODIUM SULFATE.
APPLICATION FILED MAY 25, 1906.
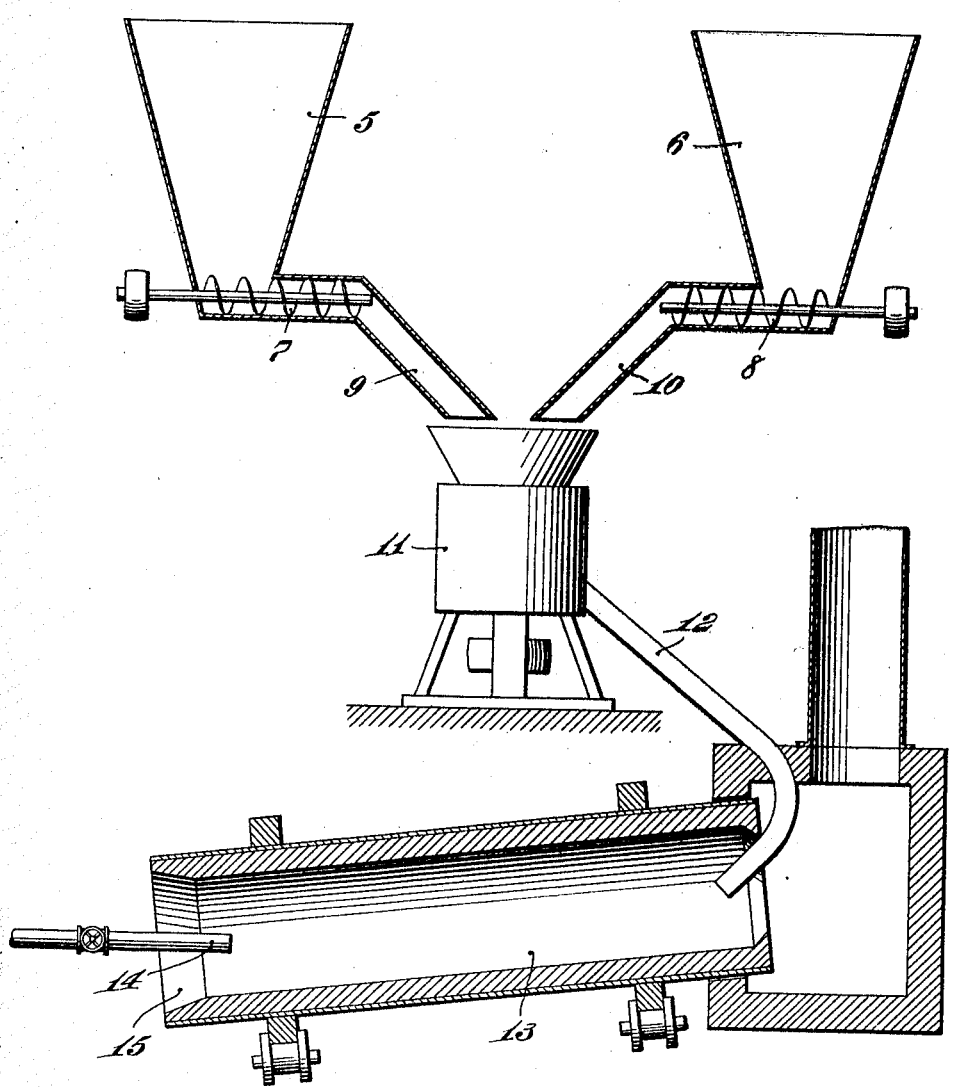
WITNESSES:
INVENTOR
John D. Pennock
BY
ATTORNEY.

UNITED STATES PATENT OFFICE.

JOHN D. PENNOCK, OF SYRACUSE, NEW YORK, ASSIGNOR TO THE SOLVAY PROCESS COMPANY, A CORPORATION OF NEW YORK.

METHOD OF MAKING SODIUM SULFATE.

No. 870,746.      Specification of Letters Patent.      Patented Nov. 12, 1907.

Application filed May 25, 1906. Serial No. 318,604.

*To all whom it may concern:*

Be it known that I, JOHN D. PENNOCK, a citizen of the United States, residing at Syracuse, in the county of Onondaga and State of New York, have invented a new and useful Method of Making Sodium Sulfate, of which the following is a specification.

This invention relates to the manufacture of sodium sulfate.

The object of the invention is to provide an economical and effective method of converting commercial niter cake, or acid sodium sulfate, $HNaSO_4$, into sodium sulfate. As is well known, acid sodium sulfate is produced in large quantities in the form of niter cake in the manufacture of nitric acid and is at the present time substantially a waste product. It has heretofore been proposed to convert this into sodium sulfate by various methods, none of which have proven sufficiently advantageous to insure general adoption.

According to this process the niter cake, commonly containing the equivalent of about 36 percent. of free sulfuric acid, is mixed with a suitable sodium compound having an alkaline reaction, as sodium hydrate or carbonate, or with a mixture containing the same. The alkaline sodium compound should be used in substantially the theoretical proportion required to neutralize the sulfuric acid present, and the mixture should be intimate, this being preferably effected by grinding the materials together. The mixture so prepared is then heated to bring about the reaction, the most effective temperature for rapid and complete reaction being from 250° to 300° C. This heating is preferably accomplished in a rotary cylinder heated internally by gas.

I prefer to proceed substantially as follows:—Commercial niter cake containing about 90 percent. of acid sodium sulfate and 9 percent. of normal sodium sulfate is intimately mixed or ground with soda ash, the proportions being approximately 1000 pounds niter cake to 398 pounds soda ash. The resulting intimate mixture is furnaced at a temperature of about 300° C. or somewhat less. In case small lumps are produced in the heating these may be afterward ground to powder.

The drawing represents in part section and part elevation, a device suitable for treating the materials in accordance with my method.

In this drawing 5 and 6 indicate hoppers for containing the materials to be treated, such for instance, as niter cake and fished salts. These materials are fed or discharged by the screws 7 and 8 respectively, through conductors 9 and 10 respectively, to the grinding and mixing mill 11. From the grinding and mixing mill 11 the material thoroughly mixed passes through conductor 12 to the inclined rotary furnace 13 of usual form. This furnace is heated by a gas flame from pipe 14. The material after being subjected to the required temperature is discharged from the furnace at 15.

Instead of soda ash as above described I may use for neutralizing the acid sulfate the product known in the art as "fished salts" and consisting substantially of a hydrated mixture of sodium hydroxid, carbonate and sulfate in proportions approximately as shown by the following analysis:

| | |
|---|---|
| $H_2O$ | 18.75% |
| $NaOH$ | 11.68 |
| $Na_2CO_3$ | 46.21 |
| $Na_2SO_4$ | 18.87 |
| $NaCl$ | .46 |

In this case both the sodium hydroxid and carbonate neutralize the sulfuric acid with production of sodium sulfate. On account of the high percentage of sulfate in fished salts a much larger proportion must be employed than in the case of soda ash, viz., 640 pounds fished salts to each 1000 pounds niter cake.

What I claim is:—

1. The method of making sodium sulfate, which consists in mixing niter cake and a sodium compound having an alkaline reaction, in approximately reacting proportions, and heating the mixture to effect reaction, substantially as described.

2. The method of making sodium sulfate, which consists in mixing niter cake and a sodium compound having an alkaline reaction, in approximately reacting proportions, and heating the mixture to a temperature above 125° C. to effect reaction, substantially as described.

3. The method of making sodium sulfate, which consists in grinding together niter cake and a sodium compound having an alkaline reaction, in approximately reacting proportions, thereby producing an intimate reacting mixture, and then heating said mixture to effect reaction, substantially as described.

4. The method of making sodium sulfate, which consists in mixing niter cake and fished salts from the manufacture of salt in approximately reacting proportions, and heating the mixture to effect reaction, substantially as described.

JOHN D. PENNOCK

Witnesses:
ROBT. CROASDALE,
EUGENE E. YOUNG